United States Patent
Niemelä

(10) Patent No.: US 9,191,392 B2
(45) Date of Patent: *Nov. 17, 2015

(54) SECURITY CONFIGURATION

(71) Applicant: F-Secure Corporation, Helsinki (FI)

(72) Inventor: Jarno Niemelä, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,091

(22) Filed: Jan. 7, 2014

(65) Prior Publication Data

US 2014/0123245 A1    May 1, 2014

Related U.S. Application Data

(63) Continuation of application No. 13/134,502, filed on Jun. 8, 2011, now Pat. No. 8,676,884.

(51) Int. Cl.
G06F 15/16    (2006.01)
H04L 29/06    (2006.01)
G06F 21/51    (2013.01)

(52) U.S. Cl.
CPC .............. H04L 63/101 (2013.01); G06F 21/51 (2013.01); H04L 63/1441 (2013.01)

(58) Field of Classification Search
None
See application file for complete search history.

(56) References Cited

U.S. PATENT DOCUMENTS

| | | | |
|---|---|---|---|
| 6,092,194 A | 7/2000 | Touboul | 726/24 |
| 6,510,458 B1 * | 1/2003 | Berstis et al. | 709/219 |
| 8,205,239 B1 | 6/2012 | Satish | 726/1 |
| 8,229,930 B2 | 7/2012 | Cohen et al. | 707/737 |
| 8,676,884 B2 * | 3/2014 | Niemela | 709/203 |
| 8,745,753 B1 * | 6/2014 | Gottlieb et al. | 726/26 |
| 2006/0253578 A1 | 11/2006 | Dixon et al. | 709/225 |
| 2008/0082662 A1 | 4/2008 | Dandliker et al. | 709/225 |
| 2008/0303689 A1 | 12/2008 | Iverson | 340/825.36 |
| 2011/0321160 A1 | 12/2011 | Mohandas et al. | 726/22 |

OTHER PUBLICATIONS

Sadan, Z. et al.; "WhiteScript: Using social network analysis parameters to balance between browser usability and malware exposure"; Computers & Security, vol. 30, No. 1; Oct. 1, 2010; pp. 4-12; Elsevier Science Publishers, Amsterdam, NL.

"Inform Action Open Source Software"; Nov. 25, 2010; XP55036589; whole document; Retrieved from the Internet: URL:http://web.archive.org/web/20101125182521/http://noscript.net/features.

* cited by examiner

*Primary Examiner* — John B Walsh
(74) *Attorney, Agent, or Firm* — Harrington & Smith

(57) ABSTRACT

An example embodiment of the present invention provides an apparatus including at least one processor; and at least one memory including executable instructions, the at least one memory and the executable instructions being configured to, in cooperation with the at least one processor, cause the apparatus to perform at least the following: retrieving, from a reputation server, reputation data of uniform resource locators (URL) of one or more web sites relating to one or more web site features that are available via the web site; and determining executable web site features on the basis of the retrieved reputation data.

15 Claims, 2 Drawing Sheets

SECURITY CONFIGURATION

CROSS REFERENCE

This application is a continuation of U.S. patent application Ser. No. 13/134,502, filed on Jun. 8, 2011, the contents of which are incorporated herein by reference in its entirety.

TECHNICAL FIELD

The exemplary and non-limiting embodiments of the present application relate generally to methods, apparatuses and computer programs and, more specifically, to the field of network security configurations provided by electronic communication systems.

BACKGROUND

The basic infrastructure of a computer network, such as the Internet, does not provide services or features necessary for reasonable computer security. The features of the Internet's network infrastructure do not protect users in the network against eavesdropping, impersonation, or hacking, because, as the Internet architecture is inherently extending autonomously, anyone can offer services over the Internet.

Most system compromises currently take place over a web browser or a browser plug-in that has a vulnerability. A significant portion of these compromises can be avoided by tightening browser settings, for example by disabling JAVA™, blocking flash or PDFs (portable document format) and running NOSCRIPT™ to prevent scripts from web sites that are not allowed. However, these security measures also break most web sites and users are forced to manually allow different web site features, such as flash and scripts, for each web site. This can be a very annoying process that normal users can find impossible and even technically oriented users find tedious. There is a continuous need to develop ways to control electronic communication systems that provide more secure and user-friendly solutions to eliminate or at least decrease these problems.

SUMMARY

The following presents a simplified summary of the invention and provides a basic understanding of some aspects of the invention. The summary is not an extensive overview of the invention, and does not identify key elements of the invention or specify the scope of the invention. Its sole purpose is to present some concepts of the invention in a simplified form as an introduction to the more detailed description that is presented later.

The claims describe various aspects of the invention.

According to one aspect of the present invention, there is provided a method, comprising: retrieving, from a reputation server, reputation data of uniform resource locators (URL) of one or more web sites relating to one or more web site features that are available via a web site to be loaded, and determining executable web site features of the web site to be loaded on the basis of the retrieved reputation data.

According to a second aspect of the present invention, there is provided an apparatus, comprising: at least one processor; and at least one memory including executable instructions, the at least one memory and the executable instructions being configured to, in cooperation with the at least one processor, cause the apparatus to perform at least the following: retrieving, from a reputation server, reputation data of uniform resource locators (URL) of one or more web sites relating to one or more web site features that are available via a web site to be loaded; and determining executable web site features of the web site to be loaded on the basis of the retrieved reputation data.

According to a third aspect of the present invention, there is provided a computer program comprising a computer-readable medium bearing computer program code embodied therein for use with a computer, the computer program code comprising: code for retrieving, from a reputation server, reputation data of uniform resource locators (URL) of one or more web sites relating to one or more web site features that are available via a web site to be loaded; and code for determining executable web site features of the web site to be loaded on the basis of the retrieved reputation data.

According to a fourth aspect of the present invention, there is provided a computer-readable medium encoded with instructions that, when executed by a computer, perform: retrieving, from a reputation server, reputation data of uniform resource locators (URL) of one or more web sites relating to one or more web site features that are available via a web site to be loaded; and determining executable web site features of the web site to be loaded on the basis of the retrieved reputation data.

All combinations of the various aspects, embodiments and features of the invention are possible and within the scope of the present invention as claimed.

BRIEF DESCRIPTION OF THE DRAWINGS

The accompanying drawings provide a more complete understanding of the embodiments of the present invention according to the following descriptions.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments set forth here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can apply to any terminal, server, corresponding component, or to any communication system or combination of different communications systems that support the required functionality. Due to the rapid development of the specifications of computer systems and protocols that are used, all words and expressions should be interpreted broadly; they are intended only to illustrate the embodiment.

The term "web site" as used here describes, for example, a collection of related web pages that contain any number of web site features. The web site and its features are accessed via a network such as the Internet, or via a private local area network through an Internet address, also called a URL (uniform resource locator). The URL specifies where a resource, such as a web site or its feature, is available and the mechanism for retrieving it. Examples of "web site features" as used here include, for example, JAVASCRIPT™™, JAVA™, FLASH™, SILVERLIGHT™, ACTIVEX™, PDF, VLC™ or any other movie player plug-ins, and any other scripts or plug-in elements. These include special-purpose languages developed to control the operation of the web pages that are displayed. For example, plug-ins are sets of software components used to add specific abilities to larger software applications and can be used, for example, to play video, scan viruses, and display different file types. Flash content may be displayed on computer systems and devices by using ADOBE FLASH PLAYER™. Browser plug-ins or other rich Internet applications may be run using SILVERLIGHT™. ACTIVEX™ components can be used to gathering data, viewing specific kinds of files and displaying animations through web browsers. VLC is an open source media player that is able to stream over networks.

Figure 1:
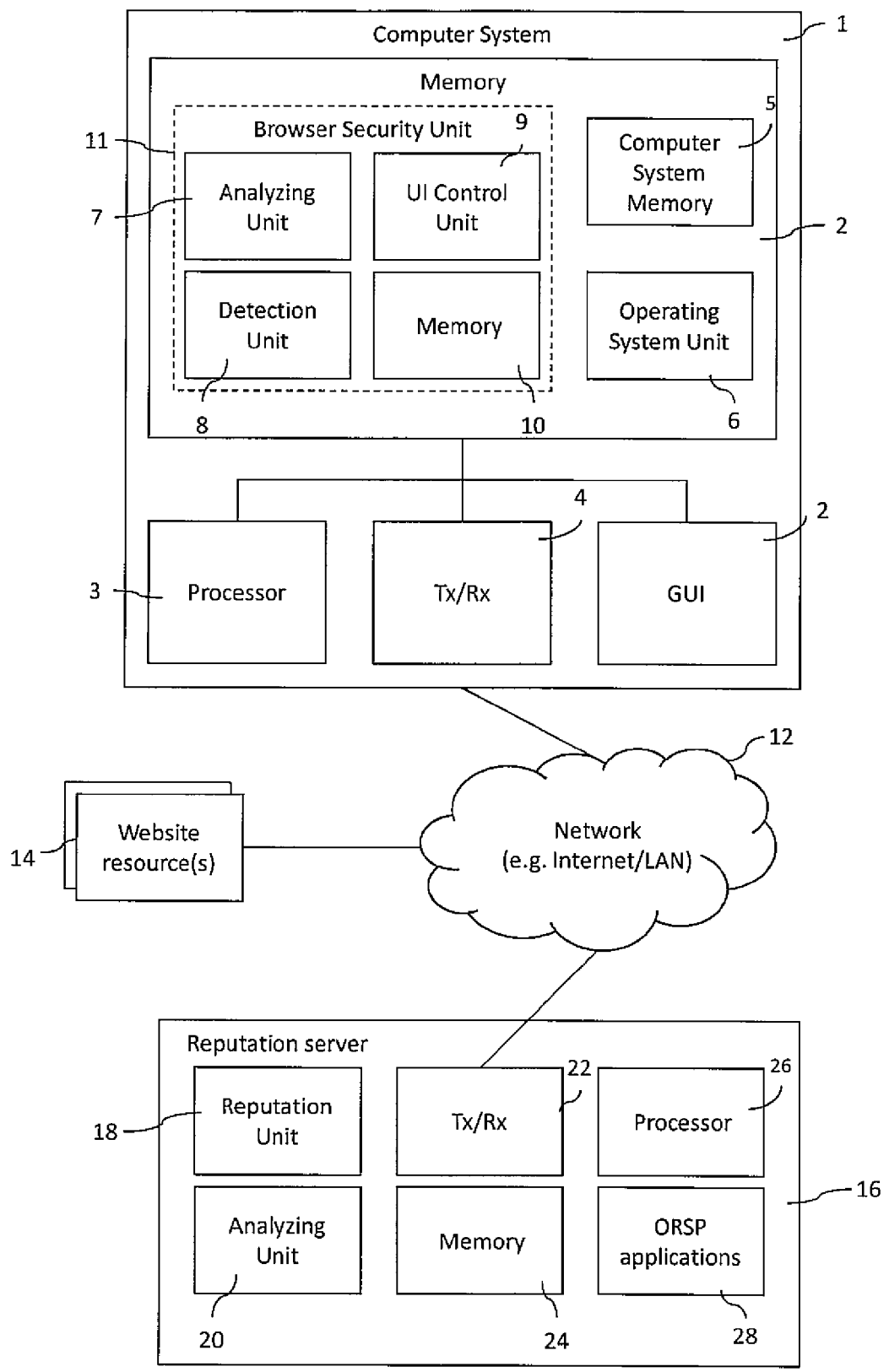
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in FIG. 1. The connections shown in FIG. 1 are logical connections, and the actual physical connections may be different. It is apparent to a person skilled in the field that the arrangement may also comprise other functions and structures.

FIG. 1 is a schematic illustration of an example of a computer system 1 that is suitable for implementing the methods that are described below. The computer system 1 can be implemented as a combination of computer hardware and software. The computer system 1 comprises a memory 2, a processor 3 and a transceiver 4. The memory 2 stores the various programs or executable files that are implemented by the processor 3, and provides a computer system memory 5 that stores any data required by the computer system 1. The programs or executable files that are stored in the memory 2, and implemented by the processor 3, can include an operating system unit 6, an analyzing unit 7, a detection unit 8, and a user interface 9. The memory 2 also provides a memory 10 that is used by the detection unit 8 and the analyzing unit 7. The analyzing unit 7, the detection unit 8, the user interface 9 and the memory 10 can be sub-units of a browser security unit 11. The transceiver 4 is used to communicate over a network 12 such as a LAN or the Internet. Typically, the computer system 1 may be a personal computer (PC), laptop, personal data assistant (PDA) or mobile phone, or any other suitable device.

The computer system 1 may communicate over the network 12 with a reputation server, for example, an online reputation server, ORSP 16. The ORSP server 16 may comprise a transceiver 22, a memory 24, a reputation unit 18, an analyzing unit 20, a processor 26 and ORSP applications 28. The embodiments of the present invention may be realized in the form of computer program products such as applications that are used for browsing protection purposes. It is possible that such computer program products are provided by the reputation server 16 from an ORSP application unit 28. It is also possible that such computer program products are provided by a security service provider or an operator server to the computer system 1 or to the reputation server 16.

Figure 2:
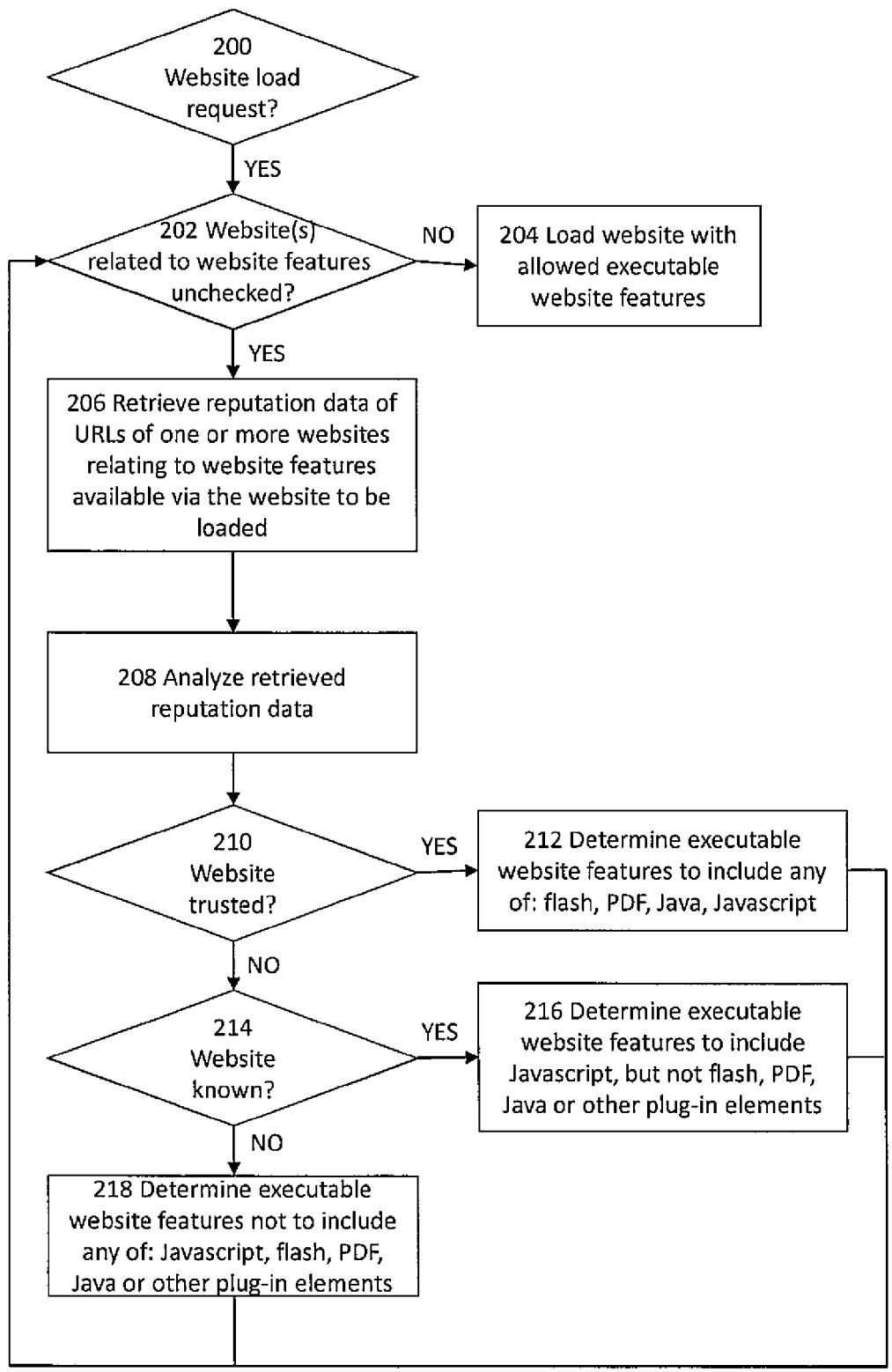
FIG. 2 shows an example of a method.

FIG. 2 is a flow diagram illustrating one example of a process. The method starts in 200 where a web site load request is detected, for example, by a detection unit 8 of a client terminal 1.

In addition to having any number of web site features that can be run directly from the web site to be loaded, the web site may also include web site features that are loaded from one or more other web sites. If, in 202, it is detected that the web site to be loaded, or one or more other web sites related to the web site features that are available via the web site to be loaded are not checked, then 206 is entered. Otherwise, 204 is entered and the web site is loaded with the allowed executable web site features. The web site may be considered unchecked when the reputation of the web site URL, from which one or more web site features are to be loaded, has not been determined. For example, the web site to be loaded may comprise links to one or more web site features that may be loaded from one or more other web sites. Therefore, if any such unchecked web sites are detected, 206 is entered, and the reputation data for the URL of the web site relating to one or more web site features that are available via the web site to be loaded is retrieved from the reputation server 16.

In 208, the retrieved reputation data is analyzed to determine the executable web site features of the web site.

210 to 218 describe one example of how the retrieved reputation data can be used in determining the allowed web site features.

In 210, if the web site from which the web site feature is to be loaded is determined to be trusted, then 212 is entered where the executable web site features are determined to include any of the following: FLASH™, PDF, JAVA™ and JAVASCRIPT™™.

If in 210 the web site from which the web site feature is to be loaded is not found in the list of trusted web sites, then 214 is entered where it is checked whether or not the web site is known.

If the web site from which the web site feature is to be loaded is known, then 216 is entered and the executable web site features are determined to include JAVASCRIPT™™, but not FLASH™, PDF, JAVA™ or other plug-in elements.

If in 214, the web site is determined to be unknown or not trusted, then 218 is entered and the executable web site features are determined to include none of the following: JAVASCRIPT™™, FLASH™, PDF, JAVA™ or other plug-in elements.

From 212, 216 and 218, 202 is entered again to check if there are more unchecked web sites to process. If not, then 204 is entered and the web site is loaded according to the determined executable web site features.

In an embodiment, the detection unit 8 of a computer system 1, such as a client terminal, detects a selection of a specific web site. This may activate the browser security software to request reputation data for the URL related to this web site's resources 14 from the reputation server 16. The client terminal 1 may, for example, transmit a query about the reputation of the selected web sites to the reputation server 16.

The reputation server 16 receives the request for the reputation data and processes it in the reputation unit 18, for example. The reputation data may be retrieved from the memory 24 of the reputation server 16 and then transmitted to the client terminal 1. The reputation data transmitted to the client terminal 1 may comprise, for example, information about whether the web site and/or its features are found on a list of trusted web sites. The reputation data transmitted to the client terminal 1 may also comprise more detailed information related to the web site and/or the related web site features.

In an embodiment, the client terminal 1 may be configured to modify its security settings automatically after receiving the reputation data from the reputation server 16. These security settings may be configured based on the reputation data received. In an embodiment, the analyzing unit 20 of the reputation server 16 may process the reputation data further to determine which web site features are allowed to be executed. The analyzing unit 20 may, for example, create specific instructions about the executable web site features that are allowed based on the reputation data. These instructions may then be transmitted to the client terminal 1 with the requested reputation data. The reputation server 16 may, for example, create explicit lists of what web site features are allowed for specific web sites. Thus, the client terminal 1 may allow the web site to run only those web site features that are approved in the instructions received from the reputation server 16.

In an embodiment, the analysis of which web site features can be allowed is processed in the analyzing unit 7 of the client terminal 1 based on the received reputation data from the reputation server 16. After the analysis, the allowed web site features can be run and the results can be shown in the user interface 2 of the client terminal 1. Thus, only the determined executable web site features are allowed to run when browsing the selected web site.

An embodiment of the present invention is based on the basic idea that difficult security configuration problems may be solved by automatic security settings. During the connection setup phase to a web site, the reputation of the URL of the web site to be loaded and the reputation of URLs of web sites to where web site features are linked are analyzed by a server utilizing server security software, and the security settings of a client terminal are configured by client security software.

A use case scenario may comprise one or more of the following steps:
  user clicks a web site
  client terminal transmits a query requesting reputation data of URLs related to the web site
  if the web site is reported to be trusted, the client terminal allows the web site to run FLASH™, PDF, JAVA™ and JAVASCRIPT™™
  if the web site is reported to be known but not trusted, then the client terminal allows the web site to run JAVASCRIPT™™ but no FLASH™, PDF, JAVA™ or other commonly exploited plug-ins
  if the web site is reported to be unknown, then the client terminal does not allow JAVASCRIPT™™ or any plug-ins.

In another use case scenario, a web site 'yle.fi' includes JAVASCRIPT™ and a link to a video file that resides in a domain 'iltasanomat.fi'. First, the reputation data related to 'yle.fi' is checked for JAVASCRIPT™. The reputation data received reveals that 'yle.fi' can be found on a list of trusted web sites. Therefore, the JAVASCRIPT™ can be allowed to be executed. The reputation data related to 'iltasanomat.fi' is also checked for the video file. As 'iltasanomat.fi' can also be found on the list of trusted web sites, the video file is allowed to run once the user browses the 'yle.fi' web site.

In yet another use case scenario, an unknown web site 'dansblog.com' includes JAVASCRIPT™, a link to GOOGLE ANALYTICS JAVASCRIPT™ and a video link to YOUTUBE™. First, the reputation of 'dansblog.com' is checked and it is found unknown. Thus, the JAVASCRIPT™ is not allowed to run. On the other hand, the GOOGLE ANALYTICS JAVASCRIPT™ is allowed because it originated from 'google.com', which is trusted. Finally, the video file is also allowed because it comes from a trusted domain, 'youtube.com'.

In another use case scenario, 'newyorktimes.com' has been hacked and it now includes a link to a hostile PDF file originating from a domain '432.foo.cn'. In this case, the PDF file is not allowed even though 'newyorktimes.com' is trusted. This is because the retrieved reputation data reveals that the PDF file comes from an unknown domain.

In an embodiment, the user may control the security settings of the client terminal as desired. For example, it may be beneficial to occasionally modify the lists of allowed web site features, for example, related to lists of known, trusted or unknown web sites. New web site features may be allowed and some features may be removed depending on changes in the environment. It is also possible that the security settings of the client terminal are automatically configured, for example, based on regular updates that are received from the security server.

Without in any way limiting the scope, interpretation or application of the claims appearing below, the technical effects of one or more of the example embodiments disclosed here reduce the security risks caused by potentially harmful web site features on end user devices. Resources of the system can also be saved when there is no need to allow each web site feature separately. Web site attacks structured so that the trusted web site only includes a redirect to a hostile web site rather than directly host payload may also be prevented.

The steps, points, signaling messages and related functions described above in relation to FIG. 2 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or article of manufacture which can contain, store, or maintain programming, data or digital information for use by or in connection with an instruction execution system, including the processor 3, 26 in the exemplary embodiment.

An embodiment provides a computer program product that comprises a computer-readable medium bearing computer program code embodied therein for use with a computer. The computer program code comprises code for retrieving reputation data of uniform resource locators (URL) of one or more web sites relating to one or more web site features that are available via the web site from a reputation server; and code for determining executable web site features of the web site to be loaded on the basis of the retrieved reputation data.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A method comprising:
receiving at a reputation server, from a client terminal, a request for reputation data of uniform resource locators (URL) of one or more web sites relating to one or more web site features that are available via a web site to be loaded;
retrieving requested reputation data from a non-transitory memory of the reputation server; and
transmitting, to the client terminal, the requested reputation data for enabling configuring security settings of the client terminal based upon the reputation data including defining, for each URL, which types of executable features are allowed to be loaded, and loading the web site and determining which of the executable web site features of the web site are to be loaded on the basis of the security settings.

2. The method of claim 1, wherein the requested reputation data comprises information about whether the web site and the related one or more web site features are found on a list of trusted web sites.

3. The method of claim 1, further comprising:
processing the requested reputation data to determine which web site features are allowed to be executed, and wherein the reputation data to be transmitted comprises instructions to the client terminal about which executable web site features are allowed to be executed.

4. The method of claim 3, further comprising:
creating a list of allowed web site features for the web site, and wherein the reputation data to be transmitted comprises the list of allowed web site features for enabling the client terminal to load only those web site features that are on the allowed list.

5. The method of claim 1, wherein the one or more web site features comprise at least one of the following: any movie player plug-in, and any script or plug-in element.

6. An apparatus comprising:
a reputation server including;
at least one processor; and
at least one non-transitory memory including executable instructions,
the at least one non-transitory memory and the executable instructions being configured to, in cooperation with the at least one processor, cause the apparatus to perform at least the following:
receiving at the reputation server, from a client terminal, a request for reputation data of uniform resource locators (URL) of one or more web sites relating to one or more web site features that are available via a web site to be loaded;
retrieving requested reputation data from the non-transitory memory of the reputation server; and
transmitting, to the client terminal, the requested reputation data for enabling configuring security settings of the client terminal based upon said reputation data including defining, for each URL, which types of executable features are allowed to be loaded, and loading the web site and determining which of the executable web site features of the web site are to be loaded on the basis of said security settings.

7. The apparatus of claim 6, wherein the requested reputation data comprises information about whether the web site and the related one or more web site features are found on a list of trusted web sites.

8. The apparatus of claim 6, wherein the apparatus is further configured to process the requested reputation data to determine which web site features are allowed to be executed, and wherein the reputation data to be transmitted comprises instructions to the client terminal about which executable web site features are allowed to be executed.

9. The apparatus of claim 8, wherein the reputation server is further configured to create a list of allowed web site features for the web site, and wherein the reputation data to be transmitted comprises the list of allowed web site features for enabling the client terminal to load only those web site features that are on the allowed list.

10. The apparatus of claim 6, wherein the one or more web site features comprise at least one of the following: any movie player plug-in, and any script or plug-in element.

11. A non-transitory computer-readable medium encoded with instructions that perform:
receiving at a reputation server, from a client terminal, a request for reputation data of uniform resource locators (URL) of one or more web sites relating to one or more web site features that are available via a web site to be loaded;
retrieving requested reputation data from the reputation server; and
transmitting, to the client terminal, the requested reputation data for enabling configuring security settings of the client terminal based upon the reputation data including defining, for each URL, which types of executable features are allowed to be loaded, loading the web site and determining which of the executable web site features of the web site are to be loaded on the basis of said security settings.

12. The non-transitory computer-readable medium of claim 11, wherein the requested reputation data comprises information about whether the web site and the related one or more web site features are found on a list of trusted web sites.

13. The non-transitory computer-readable medium of claim 12, further configured to process the requested reputation data to determine which web site features are allowed to be executed, and wherein the reputation data to be transmitted comprises instructions to the client terminal about which executable web site features are allowed to be executed.

14. The non-transitory computer-readable medium of claim 13, further configured to create a list of allowed web site features for the web site, and wherein the reputation data to be transmitted comprises the list of allowed web site features for enabling the client terminal to load only those web site features that are allowed in the list.

15. The non-transitory computer-readable medium of claim 12, wherein the one or more web site features comprise at least one of the following: any movie player plug-in, and any script or plug-in element.

* * * * *